US007620748B1

(12) United States Patent
Bruce et al.

(10) Patent No.: US 7,620,748 B1
(45) Date of Patent: Nov. 17, 2009

(54) HARDWARE ASSISTED NON-VOLATILE MEMORY-TO-INPUT/OUTPUT DIRECT MEMORY ACCESS (DMA) TRANSFER

(75) Inventors: Ricardo Bruce, Union City, CA (US); Rey Bruce, San Jose, CA (US); Federico Zalzos Sambilay, Jr., Bulacan (PH); Bernard Sherwin Leung Chiw, Quezon (PH)

(73) Assignee: Bitmicro Networks, Inc., Fremont, CA (US)

( * ) Notice: Subject to any disclaimer, the term of this patent is extended or adjusted under 35 U.S.C. 154(b) by 88 days.

(21) Appl. No.: 11/399,736

(22) Filed: Apr. 6, 2006

(51) Int. Cl.
*G06F 13/28* (2006.01)
*G06F 13/36* (2006.01)
(52) U.S. Cl. ......................... 710/22; 710/308
(58) Field of Classification Search .................. 710/22, 710/308
See application file for complete search history.

(56) References Cited

U.S. PATENT DOCUMENTS

| 5,644,784 | A | * | 7/1997 | Peek ............................ 710/24 |
| 5,822,251 | A | * | 10/1998 | Bruce et al. ............. 365/185.33 |
| 5,881,264 | A | * | 3/1999 | Kurosawa .................... 712/217 |
| 5,918,033 | A | * | 6/1999 | Heeb et al. .................... 712/217 |
| 6,557,095 | B1 | * | 4/2003 | Henstrom .................... 712/216 |
| 2007/0174493 | A1 | * | 7/2007 | Irish et al. ...................... 710/5 |

* cited by examiner

*Primary Examiner*—Henry W. H. Tsai
*Assistant Examiner*—Hyun Nam
(74) *Attorney, Agent, or Firm*—Uriarte Law

(57) ABSTRACT

In conventional storage device system, data transfer from memory to IO bus has to go through an intermediate volatile memory (cache). Data transfer therefore is completed in two steps—data is transferred from memory to cache and then from cache to the IO bus. Memory-to-cache transfer is handled by one DMA engine and another DMA engine for cache-to-IO transfer. To start the transfer, processor prepares the DMA transfer from memory to cache. Upon completion of the memory-to-cache transfer, the processor is interrupted to prepare the transfer from cache to IO. In between transfers, the processor has to intervene to setup the next transfer utilizing the precious processor cycles. The present invention improves on the above process using two novel schemes; 1) The use of dependency table to facilitate the transfer from memory-to-IO with less intervention from the processor and 2) the use of Bus Snooping scheme to bypass the transfer to cache making the transfer directly from memory to IO bus. This makes the transfer from memory to IO completed in single transfer.

13 Claims, 7 Drawing Sheets

*Prior Art*

HARDWARE ASSISTED NON-VOLATILE MEMORY-TO-INPUT/OUTPUT DIRECT MEMORY ACCESS (DMA) TRANSFER

BACKGROUND

1. Field

The present invention relates to a data storage system which is applied to a computer system, that includes volatile (e.g. SRAM, SDRAM) and nonvolatile (e.g. flash memory, mechanical hard disk) storage components.

2. Description of Related Art

In conventional storage device system, data transfer from memory to IO bus has to go through an intermediate volatile memory (cache). Data transfer therefore is completed in two steps—data is transferred from memory to cache and then from cache to the IO bus. Memory-to-cache transfer is handled by one DMA engine and another DMA engine for cache-to-IO transfer. To start the transfer, processor prepares the DMA transfer from memory to cache. Upon completion of the memory-to-cache transfer, the processor is interrupted to prepare the transfer from cache to IO. While the first data buffer is being drained, another data buffer can be filled in parallel from memory. The transfer continues in this fashion, two DMAs operating in parallel utilizing multiple buffer spaces. Notice that in between transfers, the processor has to intervene to setup the next transfer utilizing the precious processor cycles. Note that each of the transfers, memory-to-cache and cache-to-IO, can also be handled using two or more DMA engines; either DMAs are used sequentially or simultaneously.

SUMMARY OF THE INVENTION

The invention being presented can improve on the above process using two novel schemes; 1) The use of dependency table to facilitate the transfer from memory-to-IO with less intervention from the processor and 2) the use of Bus Snooping scheme to bypass the transfer to cache making the transfer directly from memory to IO bus. This makes the transfer from memory to IO completed in single transfer.

To minimize the intervention of the processor during the transfer of data from memory to IO, DMA engines must be able to handle the transfer autonomously. This can be realized using the dependency table. Each entry in the table holds the status of each transfer. Once the transfer from memory to cache is done, the status of the transfer becomes "completed". This change in status triggers the transfer of data from cache to IO bus. Once the transfer from cache to IO is started, the entry can be used again for another transfer. The handling and monitoring of the dependency table is done by the hardware with minimal help from the processor. The whole process saves the processor precious processor cycle that is supposed to be used every time the processor gets interrupted for every transfer completed.

By bypassing the transfer from cache to IO bus, the latency of the transfer from memory to IO bus can be reduced. This can be done through bus snooping. With bus snooping, the usual transfer from memory to cache still happens but the data bus from memory to cache can be snooped. Upon detection of the first valid data, the data bus is sampled, directly transferring data from memory to IO bus. This scheme however must guarantee that the content of the output buffer can be drained faster than it is being filled. If not, the buffer will overflow forcing the snooping of the bus to be terminated. However, when the memory-to-cache transfer is completed, the cache-to-memory transfer can start where bus snooping ends. Other structures and methods are disclosed in the detailed description below. This summary does not purport to define the invention. The invention is defined by the claims.

DETAILED DESCRIPTION OF THE INVENTION

Figure 1:
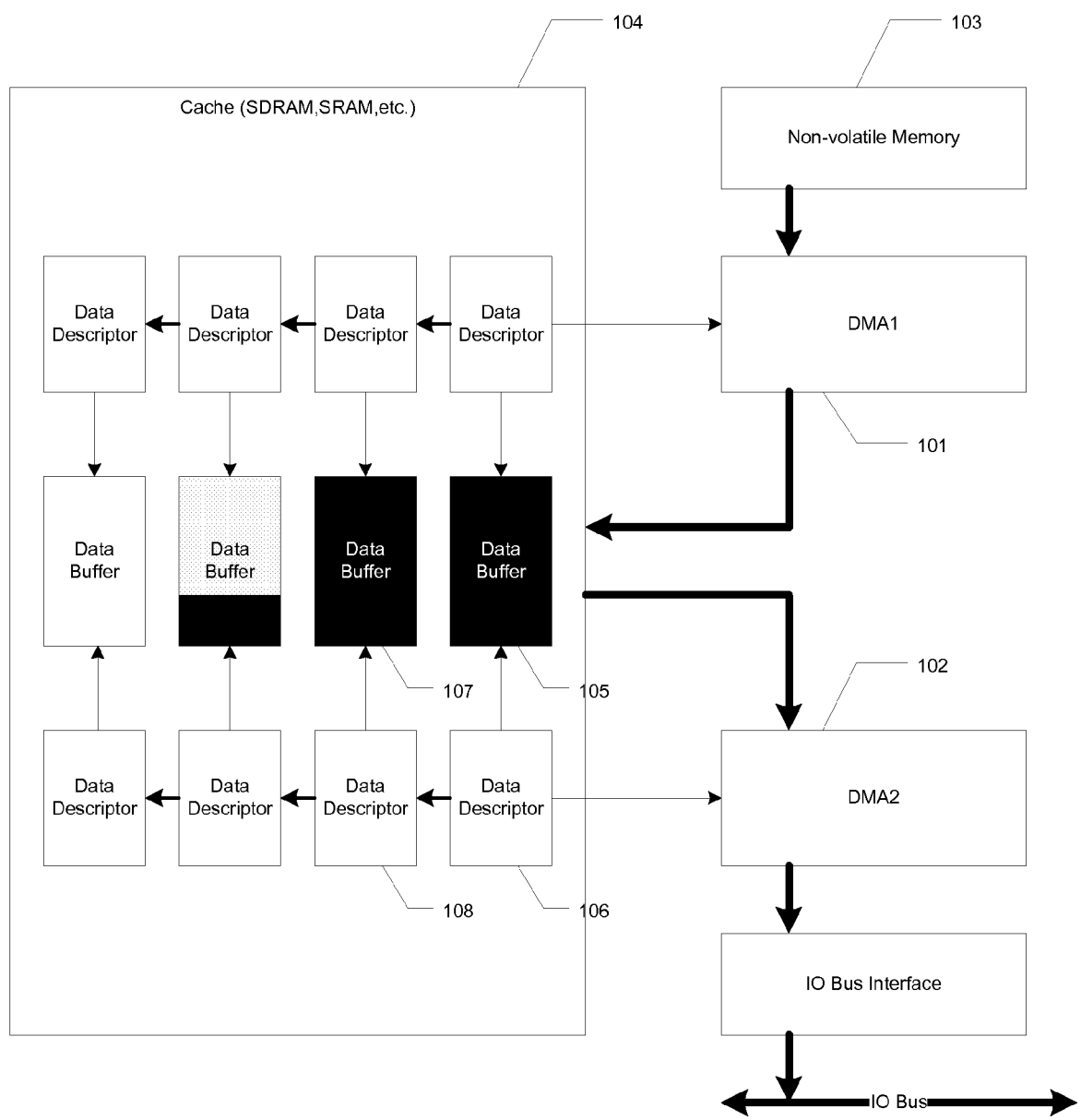
FIG. 1 is a diagram illustrating the conventional way of transferring data from memory to IO bus where the processor must interfere in between transfers.

In conventional storage device system as shown in FIG. 1, where data has to be transferred from memory 103 to cache 104; the processor has to periodically intervene the process for preparing and enabling DMA engines between transfer boundaries. Before a DMA transfer can start, information like the source and destination start address, size of the data to transfer, etc. are normally supplied first. One set of this information can be called a descriptor. Instead of preparing another descriptor after completing a DMA transfer just before starting the next transfer, it can be done more efficiently by initially preparing more than one descriptor then let the DMA engine do the fetching, decoding and execution of descriptors by itself. The firmware just keeps adding more descriptors to the list of descriptors. In FIG. 1, DMA1 101 has to do 4 DMA transfers from memory 103 to cache 104 utilizing 4 data buffers. DMA2 102 has to transfer the data from data buffers to the IO bus. DMA1 101 and DMA2 102 will need 4 descriptors each. Assuming that all descriptors have already been prepared, DMA1 101 now has to start transferring data. After DMA1 101 has filled the first data buffer 105, the firmware is notified through interrupt. Firmware then enables the corresponding descriptor 106 of DMA2 102. The rest of the descriptors will not be enabled since the corresponding data buffers are not yet ready for draining. DMA2 102 starts draining the first data buffer 105 while DMA1 101 is filling up the next data buffer 107. The processor is interrupted again after DMA1 101 has filled up the second data buffer 107. Firmware enables the next descriptor 108 so DMA2 102 can start draining the second data buffer 107 as soon as it is done with the first data buffer 105. The sequence continues until all 4 data buffers are filled from memory 103 and drained to the IO bus. Notice that the processor is interrupted each time DMA1 101 has finished filling up a data buffer. Note also that DMA2 102 must interrupt the processor after draining a data buffer to free up the used resources.

Figure 2:
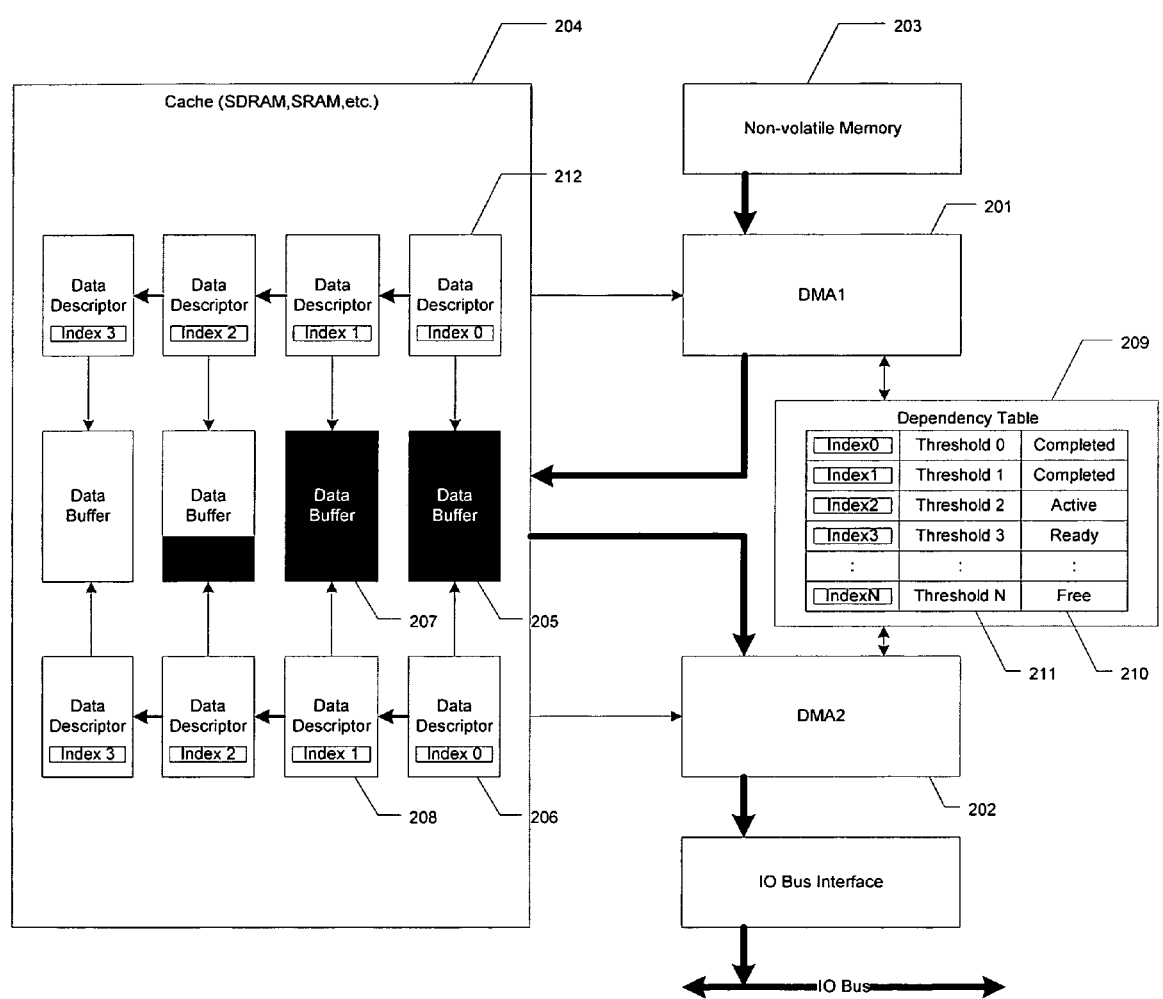
FIG. 2 is a diagram illustrating the novel way of transferring data from memory to IO bus where the process is handled with less intervention from the processor according to an embodiment of the present invention.

The above process can be improved by minimizing the intervention from the processor. This means that while DMA1 101 is filling up a data buffer, DMA2 102 must have a way to know when it can start draining the data buffer and that DMA2 102 must have a way to free up used resources all without the help of the processor. This can be done with the use of a dependency table 209 as shown in FIG. 2. FIG. 2 is a diagram illustrating the novel way of transferring data from memory to IO bus where the process is handled with less intervention from the processor according to an embodiment of the present invention. Each entry in the table holds the status 210 of the transfer and the threshold 211 relating to when the transfer can be considered as "completed". Each entry also has a corresponding index number. As in FIG. 2, index0 is assigned to the first entry in the table, index 1 to the next and so on. Initially, all entries have "free" status. Assuming a read command is received from the IO bus, the firmware recognizes that the requested data is in the memory 203. The firmware prepares the descriptors for DMA2 202. During preparation of first descriptor 206 for DMA2 202, the processor checks the dependency table 209 to see if there is an available entry. Upon seeing the status of an entry labeled index0 to be free, the processor assigns this entry to DMA2 202 first descriptor 206. The processor then sets the threshold 211 to the end address of the first buffer 205 which changes the status 210 from "free" to "ready" automatically. While DMA2 202 descriptors are being prepared, DMA1 201 descriptors can be prepared in parallel. Each descriptor pair must point to the same data buffer. In this case, both DMA1 201 first descriptor 212 and DMA2 202 first descriptor 206 point to the first data buffer 205. Since index0 status is "ready", once the first descriptor 212 of DMA1 201 is ready, DMA1 201 can start transferring data from memory 203 to cache 204 filling up the first data buffer 205, and index0 status changes from "ready" to "active". DMA2 202 is monitoring the status of index0. Upon the threshold of index0 is reached during the transfer of DMA1 201, its status changes from "active" to "completed". This change in status triggers DMA2 202 to start draining the first data buffer 205. DMA2 cannot start the transfer unless the status is "completed". Once DMA2 202 has started draining the first data buffer 205, the status of index0 changes from "completed" to "initiated". DMA1 201, upon seeing the "initiated" status changes the status to "free". This makes index0 available for another transfer. While the first data buffer 205 is being drained, DMA1 201 can start filling up the next data buffer 207. The transfer continues in this fashion, the hardware updates and monitors the dependency table 209, until all data is transferred from memory 203 to IO bus. As mentioned above, the whole process saves the precious processor cycle that would be used every time the processor gets interrupted for every transfer completed. In this embodiment of the present invention, once DMA2 202 sees the "completed" status and starts transferring the data, the status changes from "completed" to "initiated". And then, DMA1 201 upon seeing the "initiated" status, changes the status to "free" indicating the availability of the entry. This momentary transition to the "initiated" status may be monitored by other modules in the system for other purposes e.g. advanced notification of data transfer. In an alternative embodiment of the present invention where no other modules in the system are monitoring for the "initiated" status, this momentary transition to the "initiated" status is skipped or removed. Once DMA2 202 sees the "completed" status and starts transferring the data, the status directly changes from "completed" to "free", skipping the "initiated" status phase. This speeds up the availability of the entries for reuse.

Figure 3:
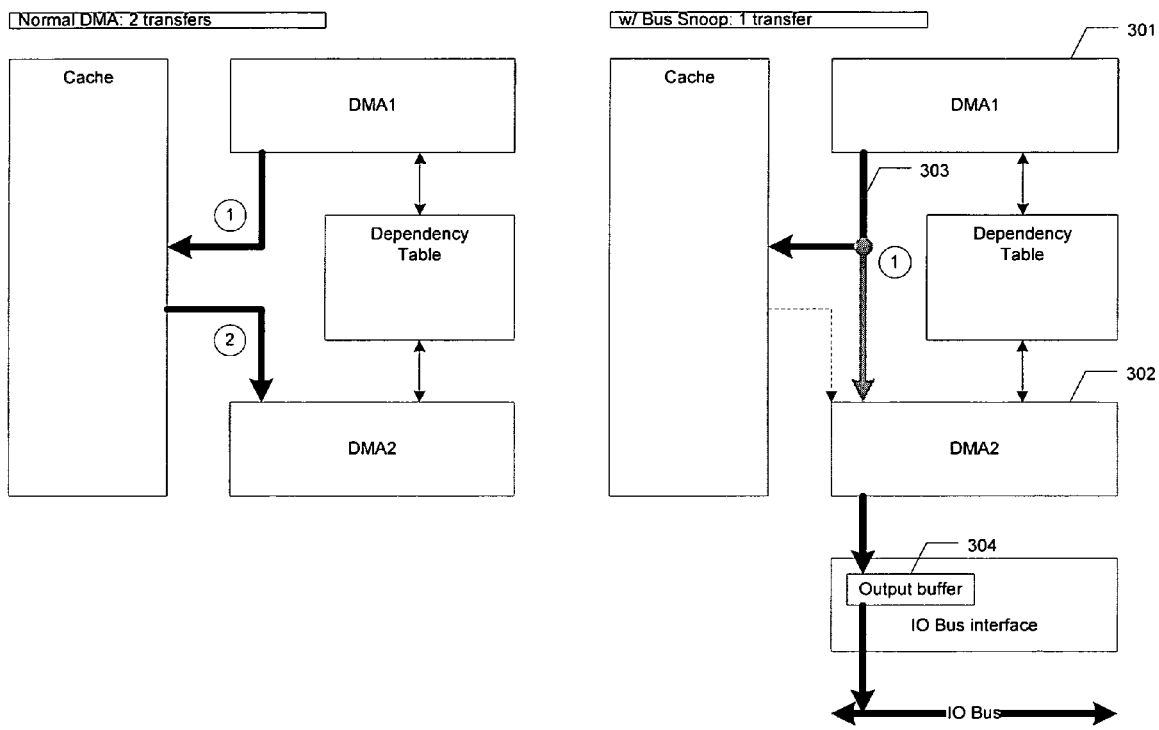
FIG. 3 is a diagram illustrating the difference of memory-to-IO transfer with and without Bus Snooping according to an embodiment of the present invention.

To further make the transfer from memory to IO more efficient, the transfer to IO bus from cache can be bypassed. This can be done through bus snooping as shown in FIG. 3. FIG. 3 is a diagram illustrating the difference of memory-to-IO transfer with and without Bus Snooping according to an embodiment of the present invention. In normal DMA, two transfers are needed to complete the transfer from memory to IO bus; one from memory to cache and another from cache to IO bus. With bus snooping, that can be done in a single transfer. The data is transferred directly from memory to IO bus. The usual transfer from memory to cache still happens but DMA2 302 has the option to tap into the data bus 303 while DMA1 301 is transferring data from memory to cache. The start address of a data buffer is stored in DMA1 301 and DMA2 302 descriptors. DMA2 302 has to catch this start address when DMA1 301 is transferring from memory to cache. Once the status of an entry in the dependency table changes to "ready"; DMA2 302 can start monitoring the address bus from DMA1 to cache to catch the start address. Detection of the start address triggers DMA2 302 to start sampling the data bus 303 according to the bus cycle timing. Knowing the offset of the first valid data from the detection of the start address, upon detection of the start address, DMA2 302 will start sampling the data bus 303 accordingly, directly transferring data from memory to IO bus. Status must be "ready" for DMA2 302 to start watching for the start address. An "active" status means that DMA2 302 missed the start address. If DMA2 302 missed the start address, then, normal DMA transfer must proceed.

It must be noted, however, that an output buffer 304 is normally placed before the IO bus. The size of this buffer 304 is significantly smaller than the cache. This means that, during bus snooping, the content of the output buffer 304 must be drained faster than it is being filled. If not, the buffer 304 will overflow. Normally, output buffers are designed such that they are being filled faster than they are being drained, so the case where output buffer 304 will not overflow will happen only when the size of the data to be transferred, if not less than, is only around the size of the output buffer 304. The system has two options to avoid the overflow. The system can flow control the transfer of DMA1 301 from memory to cache or stop the bus snooping. In the latter, since snooping did not completely transfer all data from memory to IO bus, normal DMA transfer must proceed to supplement the direct transfers. When memory-to-cache transfer is completed, the cache to IO bus transfer will resume, this time the data will come from the cache continuing where bus snooping was terminated. This scheme reduces the latency of the transfer from memory to the IO bus.

Figure 4:
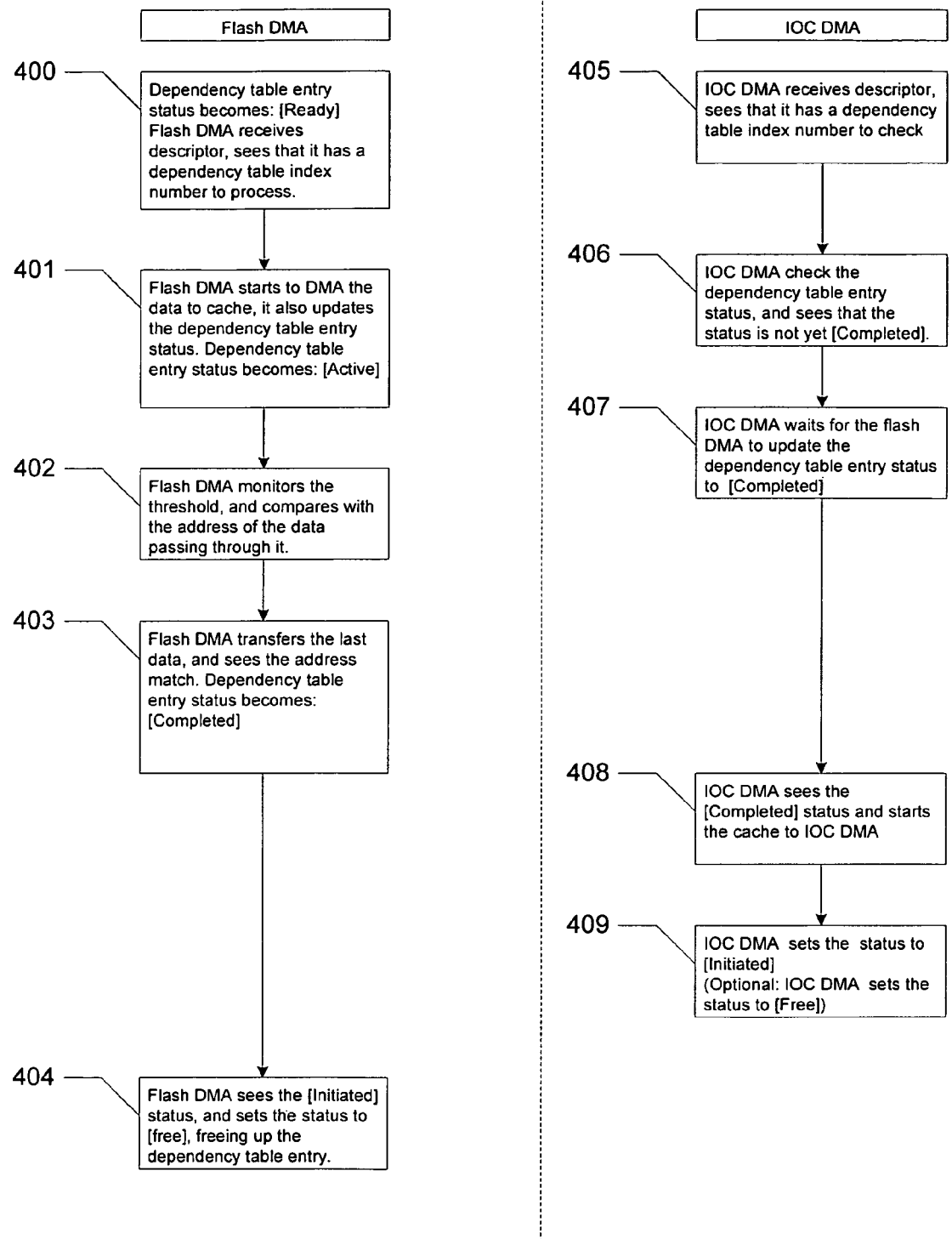
FIG. 4 is a diagram illustrating the DMA process with dependency according to an embodiment of the present invention.

FIG. 4 shows the basic process flow for the DMA using the dependency according to an embodiment of the present invention. This figure describes the steps that the flash DMA and the IOC DMA take when using dependency. Steps 400 to 404 describe the flash DMA part. Steps 405 to 409 describe the IOC DMA part. In step 400, the flash DMA receives a descriptor with the dependency bit enabled. The descriptor contains a dependency table index number. The dependency table index number in the flash DMA descriptor points to the corresponding dependency table entry that already has the "ready" status indicating that the said dependency table entry is already assigned to a particular flash descriptor and IOC descriptor pair. In step 401, the flash DMA updates the dependency table entry. The Flash DMA uses the dependency table index number to get the threshold in the dependency table. In one embodiment of the present invention, the threshold is the end address of the flash DMA, and transferring the data corresponding to this address indicates that the flash DMA is already done. In step 401, the flash DMA is also started and the dependency table entry status becomes "active". In step 402, flash DMA is ongoing, and the flash DMA is monitoring for the ending address. In this step, the dependency table entry status is still "active". In step 403, the flash DMA detects the matching end address and sets the dependency table entry status to "completed". In step 404, the flash DMA checks that the dependency table entry already has the "initiated" status set. This tells the flash DMA that the IOC DMA has already satisfied its corresponding dependency condition. The flash DMA then sets the status to "free" to indicate to the firmware that the particular dependency table entry can now be reused by the firmware. Optionally, if the "initiated" status phase is not needed and the IOC DMA directly changes the status from "completed" to "free", step 404 is omitted.

The second set of process steps, discusses the IOC DMA side dependency. In step 405, the IOC DMA receives a descriptor with the dependency bit enabled. In step 406, IOC DMA uses the index number to locate the dependency table entry, and sees that the dependency table entry status is still not yet "completed". In this step the dependency table entry status can either be "ready" or "active". In step 407, IOC DMA wait for the dependency table entry status to be become "completed". Flash DMA's steps 400, 401, and 402 may occur in parallel with IOC DMA's steps 405, 406, and 407. In step 408, IOC DMA detect that the dependency table entry status is already "completed" and starts the IOC data DMA. In step 409, IOC DMA sets the dependency table entry status to "initiated". Optionally, if the "initiated" status phase is not needed, the IOC DMA directly changes the status from "completed" to "free" and step 404 is omitted. The following steps occur in sequence: step 403, then step 408, then step 409, and then step 404.

Figure 5:
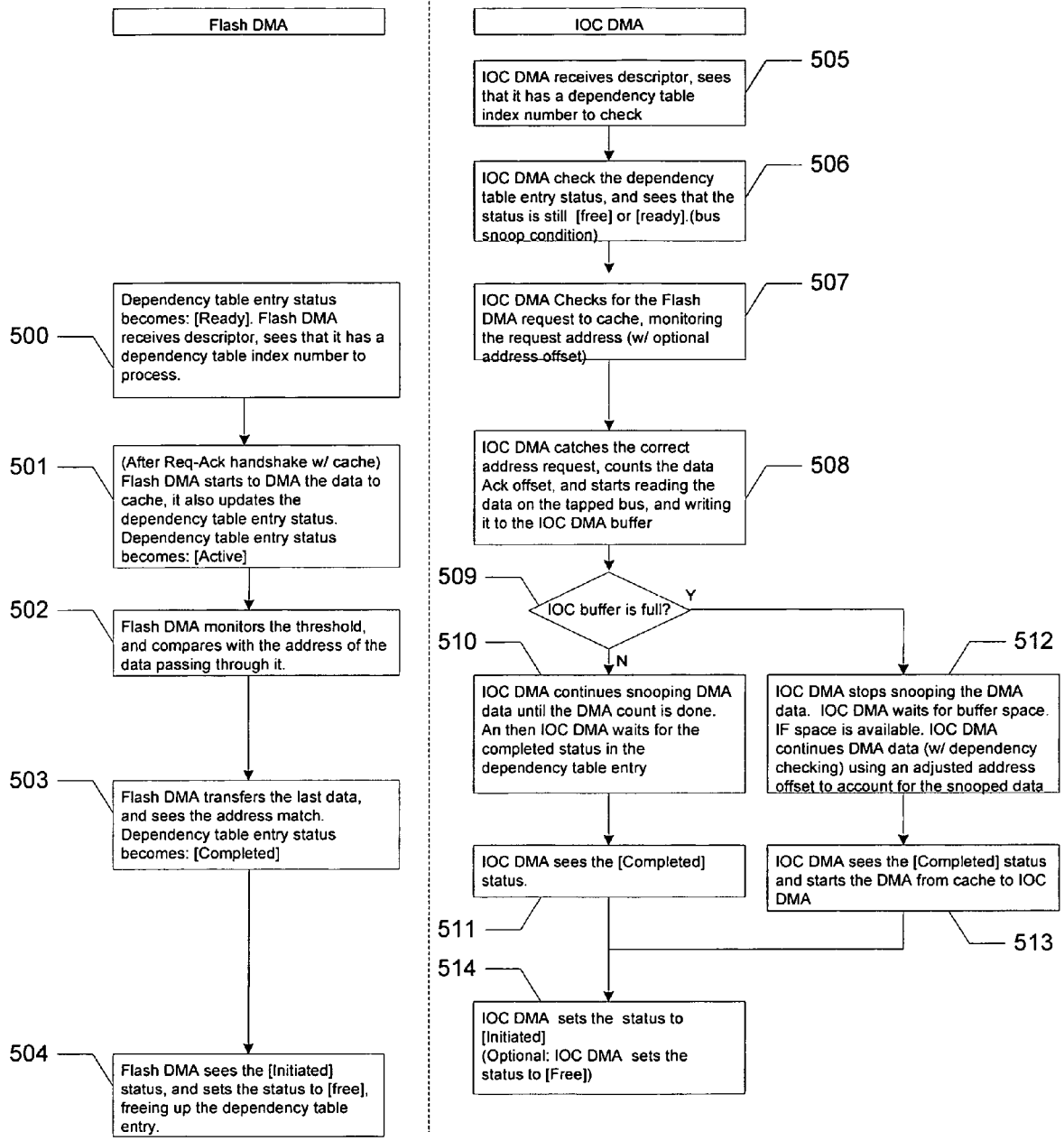
FIG. 5 is a diagram illustrating the DMA process with dependency and snooping according to an embodiment of the present invention.

FIG. 5 shows the basic process flow for the DMA using the dependency and snooping according to an embodiment of the present invention. This figure describes the steps that the flash DMA and the IOC DMA take when using dependency and snooping. Steps 500 to 504 describe the flash DMA part. Steps 505 to 514 describe the IOC DMA part. The process flow for dependency with snooping has similarities with the process flow for dependency only. The only part that changed is the process flow for the IOC DMA, since the IOC DMA side has the snooping function. The flash DMA process flow remains the same. Flash DMA steps 500 to 504, is exactly the same as the flash DMA steps 400 to 404 in the previous figure. Optionally, if the "initiated" status phase is not needed and the IOC DMA directly changes the status from "completed" to "free", step 504 is omitted.

The second set of process steps, discusses the IOC DMA side dependency with snooping. For this case the snooping feature of the IOC DMA can be enabled via a register setting. In step 505, the IOC DMA receives a descriptor with the dependency bit enabled. In step 506, the IOC DMA uses the index number and checks the dependency table entry status. If the dependency table entry status is "completed", the flash DMA has already transferred the data to cache, and the IOC DMA can proceed with normal data transfer from the cache to the IOC. If the dependency table entry status is "active", the flash DMA is still transferring data from the flash to the cache and the IOC DMA cannot proceed with the data transfer from cache to IOC since the data it needs is not yet completely in cache. If the dependency table entry status is already in "active" status, the IOC DMA also cannot begin bus snooping since there's a big possibility that the data it's trying to snoop was already transferred. In this case IOC DMA has no choice but to wait for the status to become "completed". If the dependency table entry status is "free" or "ready", the flash DMA has not yet begun transferring data to cache. For this case, IOC DMA has the option to snoop the flash DMA to cache bus, or to wait for the "completion" status and then continue with the normal DMA from cache to the IOC. In step 506, existence of a snoop condition is seen since the dependency table entry status is still "free" or "ready". In step 507, the IOC DMA starts snooping by tapping the flash DMA cache access request and cache transfer. In step 508, the IOC DMA has already caught the address of the start data in the flash DMA transfer to cache. In step 508, IOC DMA is transferring the data (presented by the flash DMA to the cache) directly to the IOC. In decision box 509, IOC DMA monitors its buffer space. If there is still enough buffer space, the process goes to step 510 and the data from the snooping data is still being transferred to the IOC until all the needed data is done. By the time the process goes to step 514, the IOC DMA has already completed its DMA via snooping, and the IOC DMA simply waits for the dependency table entry status to become "completed" so it can set the status to "initiated" in step 514, even though the actual IOC DMA transfer is already done. This is done so that the flash DMA, upon seeing the "initiated" status, can set the status to "free" again so that the dependency table entry can be re-used for the next flash-cache-IOC transfer. If the buffer becomes full, the process goes to step 512 where the snooping is stopped. Once the snooping is stopped, the IOC DMA reverts back to waiting for the dependency table entry to have a "completed" status. In this scenario, even if buffer space becomes available, snooping cannot be resumed since some flash to cache data were already bypassed during the flow control condition. In step 513, the IOC DMA sees the "completed" status of the dependency table entry, and starts to resume the IOC DMA. This time the data comes from the cache (not from the snooping) and the data starting point begins from the point where the buffer became full. When the data transfer from cache to IOC begins, the process goes to step 514 and sets the dependency table entry status to "initiated". Optionally, if the "initiated" status phase is not needed, the IOC DMA directly changes the status from "completed" to "free".

Figure 6:
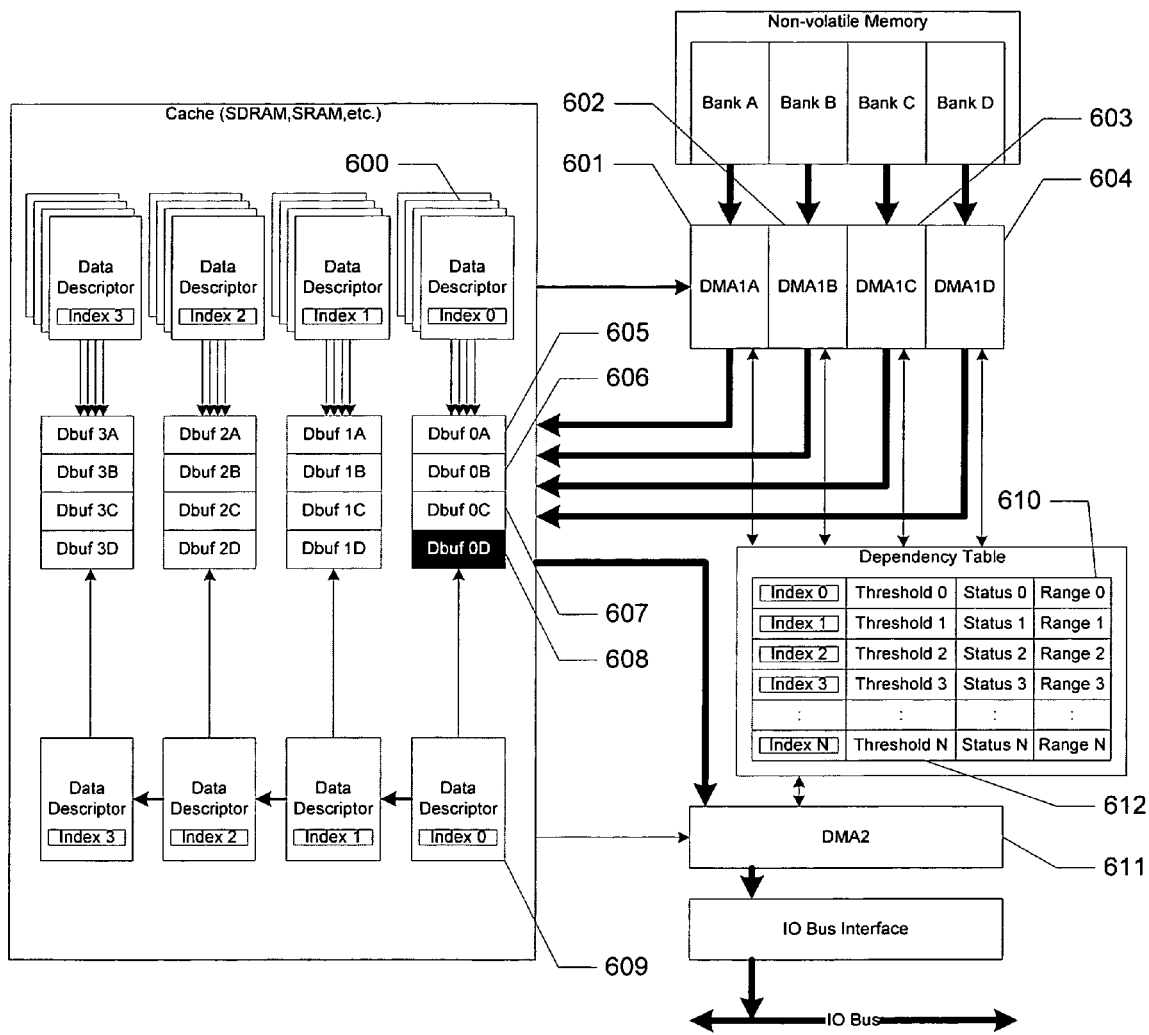
FIG. 6 is a diagram illustrating a variation of the invention with data striping according to an embodiment of the present invention.

FIG. 6 shows a variation of the invention using data striping according to an embodiment of the present invention. Access to non-volatile memory is relatively slower compared to high speed IO protocols. To speed up the non-volatile memory data transfer data striping is used together with non-volatile memory multi-bank design. The parallel access to multi-bank non-volatile memory arrays multiplies the bandwidth by the number of banks. In this embodiment of the invention, the original data buffer is split into 4 data stripe buffers, namely stripe buffer A 605, B 606, C 607, and D 608. The 4 data stripe buffers and the corresponding non-volatile memory banks, namely bank A, bank B, bank C, and bank D are handled concurrently by their respective DMA1 engines, namely DMA1A 601, DMA1B 602, DMA1C 603, and DMA1D 604. The DMA engines and data stripe buffers are paired together by their respective data descriptors 600. From the point of view of DMA2 611 and its data descriptor 609, it needs all the data from the non-volatile memory banks to be transferred to the corresponding data stripe buffers before DMA2 611 can begin. In this example, the 4 DMA engines (DMA1A 601, DMA1B 602, DMA1C 603, and DMA1D 604) concurrently process their respective non-volatile memory banks (bank A, bank B, bank C, and bank D) and corresponding data stripe buffers (data stripe buffers A 605, B 606, C 607, and D 608). Due to resource arbitration and contention, any one of the transfers to the 4 data stripe buffers may finish first, and in this example, DMA1D 604 is the $1^{st}$ to finish transferring the corresponding data to data stripe buffer D 608 in cache. In one embodiment of the present invention, the threshold field contains the address of the last data of the buffer. For this example, although the corresponding data is already fully transferred to data stripe buffer D 608 in cache, the compare with the threshold value should not trigger the setting of the "completed" status since the other data stripes are not yet fully transferred to their corresponding data stripe buffers in cache. To remedy this problem, a scheme must ensure that all the data stripes of the various DMA engines are already fully transferred to cache before the "complete" status can be set. The scheme presented here is the addition of a Range field 610 in the dependency table entry. The Range field 610 tracks the end addresses of the data stripe buffers, and counts the number of data stripe buffers that's already done with the non-volatile memory to data stripe buffer transfer. Once the count reaches the total number of data stripe buffers indicated in the Range field 610, the "complete" status can be set. More details about the Range field 610 are explained in FIG. 7.

Figure 7:
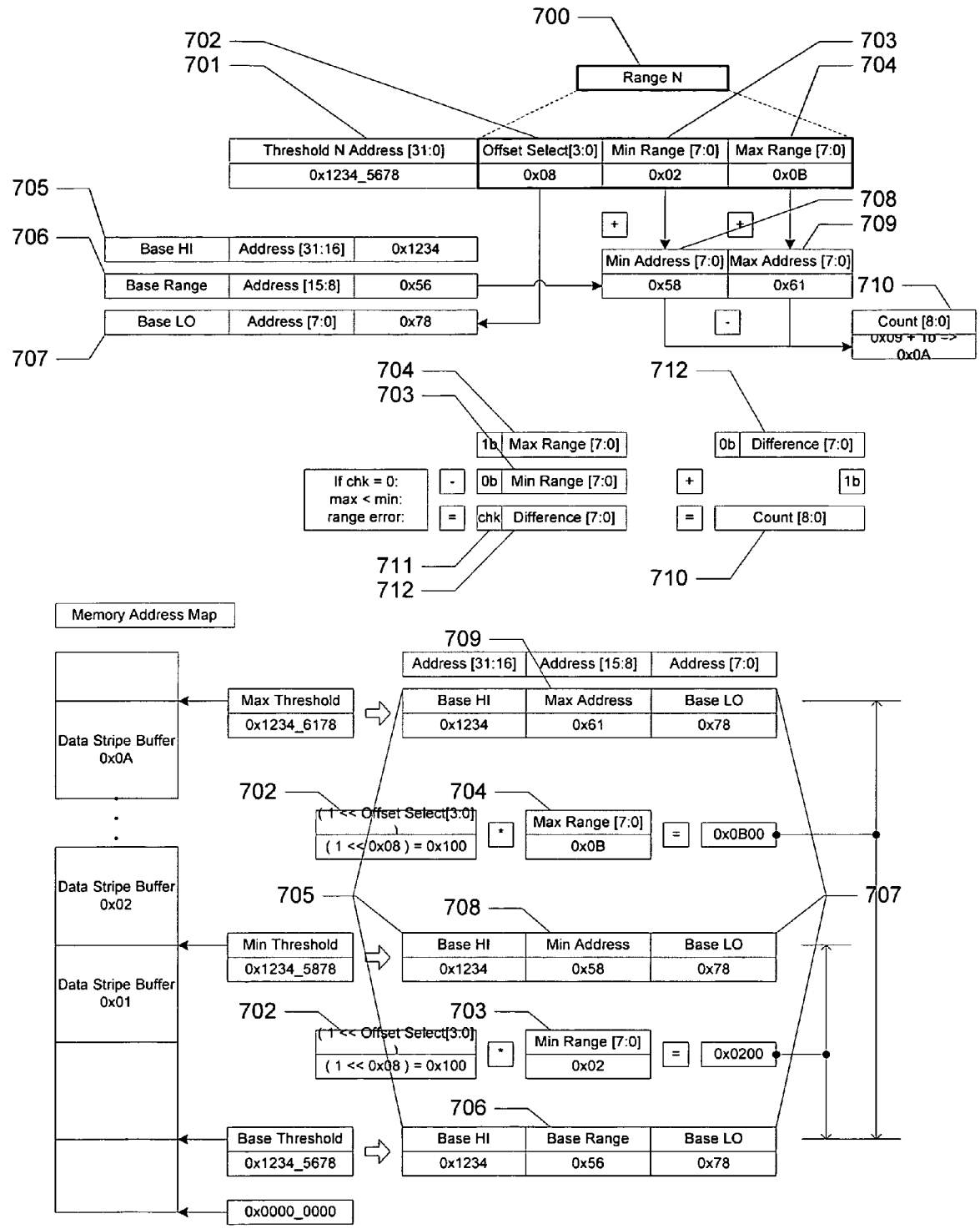
FIG. 7 is a diagram illustrating the use of the dependency table entry range field according to an embodiment of the present invention.

FIG. 7 illustrates the details of the Range field 700 according to an embodiment of the present invention. In this exemplary implementation, the Threshold field 701 comprises a 32 bit value which is made up of a 16 bit Base HI 705, an 8 bit Base Range 706 and a 8 bit Base LO 707. The Range field 700 contains information regarding the data stripe buffer size and location in the cache memory map and is made up of the Offset Select 702, Minimum Range 703, and the Maximum Range 704. The Offset Select 702 corresponds to data stripe size and determines how many bits are in the Base LO field and how many lower address bits are used to compare for the Base LO 707 value while the Minimum Range field and the Maximum Range field are fixed at 8 bit length. Offset Select 702 is related to the data stripe size in powers of two relationship. For example if the data stripe size is 64 bytes, Offset Select 702 is set to 6 bits. (stripe=128 offset=7, stripe=256 offset=8, stripe=512 offset=9). In this example, Offset Select is set to 8, so lower 8 bits of Threshold Address 701 bits [7:0] are used for the Base LO 707 compare value. Minimum Range 703 relates to the location of the first data stripe buffer in the cache memory map and determines the compare value for the ending address of the first data stripe buffer. Minimum Range 703 is added with the next 8 Threshold address bits Base Range 706 (for this example it's made up of Threshold address bits [15:8] based on an Offset Select of 8) to get the Minimum Address 708 (which is the ending middle [15:8] address bits of the first data stripe buffer). Maximum Range 704 relates to the location of the last data stripe buffer in the cache memory map and determines the compare value for the ending address of the last data stripe buffer. Maximum Range 704 is added with the next 8 Threshold address bits Base Range 706 to get the Maximum Address 709 (which is the ending middle [15:8] address bits of the last data stripe buffer). The remaining upper Threshold address bits make up the Base HI 705 address bits (for this example it's made up of Threshold address bits [31:16] based on an Offset Select of 8).

The Minimum Range 703 (appended with 1-bit binary zero value beyond its MSBit) is subtracted from the Maximum Range 704 (appended with 1-bit binary one value beyond its MSBit) to get the Difference 712. The Check bit 711 is used to verify that the Minimum Range 703 and the Maximum Range 704 values are not inverted (i.e. Minimum Range 703<=the Maximum Range 704). Since Minimum Address 708 and Maximum Address 709 are inclusive, the Difference 712 is added with 1 to get the Count 710 value. The Count 710 value is the number of data stripes present in the buffer.

As illustrated in FIG. 7, every time a valid data stripe has been transferred to its corresponding data stripe buffer in cache, its stripe buffer ending address bits [31:16, 7:0] match the corresponding bits in the Base HI 705 [31:16] and Base LO 707[7:0]. This triggers the comparison of the buffer middle address bits [15:8] with the Minimum Address 708 and Maximum Address 709. If the buffer middle address bits [15:8] fall within the address boundary determined by the Minimum Address 708 and Maximum Address 709, then a counter is incremented. The process is repeated until the counter matches Count 710 (for the number of stripes), and the table entry status becomes "completed". Since data buffer length count in the descriptor is limited (it does not cover the whole address bits), comparing only the middles address bits for the range, optimizes the compare logic, and lessens the number of bits needed for each table entry. Comparing the Base HI 705 and Base LO 707 address bits only serves as a trigger to compare the address range (Minimum Address 708, Maximum Address 709).

In one embodiment of the present invention, a data structure is used for coordinating dual channel DMA transfer wherein the data structure comprises a table comprising one or more entry, the one or more entry comprises a status initialized to be free and an index operable to be assigned to a first data descriptor and a second data descriptor if the status is free whereby a data buffer is accessed by a first and a second DMA engine according to the first and second data descriptor. Preferably, the one or more entry further comprises a threshold; and the status is set to be ready upon a corresponding index being assigned and a value being assigned to a corresponding threshold. Preferably, the first data descriptor and the second data descriptor are prepared by one or more CPU; wherein a first DMA engine transfers data from a source device to a data buffer according to the first data descriptor subsequent to the preparation completion thereof; wherein the status is set to be active upon the first DMA engine starting data transfer; wherein the status is set to be completed upon the first DMA engine data transfer reaching the threshold; wherein a second DMA engine transfers data from the data buffer to a destination device according to the second data descriptor upon the preparation completion thereof and the status being set to be completed; wherein the status is set to be initiated upon the second DMA engine starting data transfer; and wherein the status is set to be free upon the first DMA engine detecting the status being set to initiated whereby the initiated state is monitored for advanced notification of data transfer. Preferably, the first data descriptor and the second data descriptor are prepared concurrently. Preferably, the first and second DMA engine transfer data from the source device to the destination device in response to the data structure without intervention from the one or more CPU subsequent to the first and second data descriptors preparation completion thereof. Optionally, data buffer comprises one or more data stripe buffer; wherein one or more entry further comprises one or more range for tracking the end address of the one or more data stripe buffer and the number of data stripe buffer fully transferred. Preferably the one or more range further comprises one or more offset select, one or more minimum range and one or more maximum range whereby size of the one or more data stripe buffer is determined and compare logic for generating completed status is reduced. Preferably, data transfer to the one or more data stripe buffer is handled by one or more DMA engine.

In one embodiment of the present invention, a data transfer method is used that comprises the steps of: checking a data structure for an entry comprising a state set to be free; assigning an index of the entry to a first data descriptor and a second data descriptor; assigning a value to a threshold of the entry; setting the state to be ready upon assigning the threshold; preparing the first data descriptor and the second data descriptor by one or more CPU; transferring data from a source device to a data buffer using a first DMA engine according to the first data descriptor subsequent to the preparation completion thereof; setting the state to be active upon the first DMA engine starting data transfer; setting the state to be completed upon the first DMA engine data transfer reaching the threshold of the entry; transferring data from the data buffer to a destination device using a second DMA engine according to the second data descriptor upon the preparation completion thereof and the state being assigned to be completed; setting the state to be initiated upon the second DMA engine starting data transfer; and setting the state to be free upon the first DMA engine detecting the status being set to initiated whereby the initiated state is monitored for advanced notification of data transfer. Preferably, the one or more CPU prepares the first data descriptor and the second data descriptor concurrently. Preferably, the first and second DMA engine transfer data from the source device to the destination device in response to the data structure without intervention from the one or more CPU subsequent to the first and second data descriptors preparation completion thereof.

In one embodiment of the present invention, a data transfer method is used that comprises the steps of: checking a data structure for an entry comprising a state set to be free; assigning an index of the entry to a first data descriptor and a second data descriptor; assigning a value to a threshold of the entry; setting the state to be ready upon assigning the threshold; preparing the first data descriptor and the second data descriptor by one or more CPU; transferring data from a source device to a data buffer using a first DMA engine according to the first data descriptor subsequent to the preparation completion thereof; monitoring an address bus for detecting a starting address of the first data descriptor; monitoring a data bus for detecting a first valid data of the first DMA engine; transferring one or more valid data of the first DMA engine to a destination device using a second DMA engine according to the second data descriptor upon detecting the first valid data of the first DMA engine; setting the state to be completed upon the first DMA engine data transfer reaching the threshold of the entry; setting the state to be initiated subsequent to the second DMA engine starting data transfer and the state being set to completed; and setting the state to be free upon the first DMA engine detecting the status being set to initiated. Optionally, the second DMA engine is flow controlled for preventing a buffer overflow of the second DMA engine. Optionally, after the step of transferring one or more valid data of the first DMA engine, the data transfer method further comprises the steps of: Stopping the second DMA engine data transfer upon a buffer overflow; and transferring one or more data from the data buffer to the destination device using a second DMA engine according to the second data descriptor upon the first DMA engine data transfer reaching the threshold of the entry.

In one embodiment of the present invention, a data transfer method is used that comprises the steps of transferring data from a source device to a data buffer using a first DMA engine according to a first data descriptor prepared by one or more CPU; transferring data from the data buffer to a destination device using a second DMA engine according to a second data descriptor prepared by the one or more CPU; wherein the data buffer is accessed by the first and second DMA engine according to a data structure whereby data transfer is without CPU intervention subsequent to the first and second data descriptor being prepared by the one or more CPU.

In one embodiment of the present invention, a data transfer method is used that comprises the steps of checking a data structure for an entry comprising a state set to be free; assigning an index of the entry to a first data descriptor and a second data descriptor; assigning a value to a threshold of the entry; setting the state to be ready upon assigning the threshold; preparing the first data descriptor and the second data descriptor by one or more CPU; transferring data from a source device to a data buffer using a first DMA engine according to the first data descriptor subsequent to the preparation completion thereof; monitoring an address bus for detecting a starting address of the first data descriptor; monitoring a data bus for detecting a first valid data of the first DMA engine; transferring one or more valid data of the first DMA engine to a destination device using a second DMA engine according to the second data descriptor upon detecting the first valid data of the first DMA engine; setting the state to be completed upon the first DMA engine data transfer reaching the threshold of the entry; and setting the state to be free subsequent to the second DMA engine starting data transfer and the state being set to completed.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A data transfer method comprising the steps of:
checking a data structure for an entry comprising a state set to be free;
assigning an index of the entry to a first data descriptor and a second data descriptor whereby a data buffer is accessed by a first and second DMA engine according to the first and second data descriptor for dual channel DMA data transfer without CPU intervention subsequent to the first and second data descriptor being prepared by CPU;
assigning a value to a threshold of the entry;
setting the state to be ready upon assigning the threshold;
preparing the first data descriptor and the second data descriptor by one or more CPU;
transferring data from a source device to a data buffer using a first DMA engine according to the first data descriptor subsequent to the preparation completion thereof;
setting the state to be active upon the first DMA engine starting data transfer;
setting the state to be completed upon the first DMA engine data transfer reaching the threshold of the entry;
transferring data from the data buffer to a destination device using a second DMA engine according to the second data descriptor upon the preparation completion thereof and the state being assigned to be completed; and
setting the state to be free subsequent to the second DMA engine starting data transfer.

2. A data transfer method comprising the steps of:
checking a data structure for an entry comprising a state set to be free;
assigning an index of the entry to a first data descriptor and a second data descriptor whereby a data buffer is accessed by a first and second DMA engine according to the first and second data descriptor for dual channel DMA data transfer without CPU intervention subsequent to the first and second data descriptor being prepared by CPU;

assigning a value to a threshold of the entry;
setting the state to be ready upon assigning the threshold;
preparing the first data descriptor and the second data descriptor by one or more CPU;
transferring data from a source device to a data buffer using a first DMA engine according to the first data descriptor subsequent to the preparation completion thereof;
setting the state to be active upon the first DMA engine starting data transfer;
setting the state to be completed upon the first DMA engine data transfer reaching the threshold of the entry;
transferring data from the data buffer to a destination device using a second DMA engine according to the second data descriptor upon the preparation completion thereof and the state being assigned to be completed;
setting the state to be initiated upon the second DMA engine starting data transfer; and
setting the state to be free upon the first DMA engine detecting the status being set to initiated.

3. The method of claim 2 wherein the second DMA engine is flow controlled for preventing a buffer overflow of the second DMA engine.

4. A data transfer method comprising the steps of:
checking a data structure for an entry comprising a state set to be free;
assigning an index of the entry to a first data descriptor and a second data descriptor;
assigning a value to a threshold of the entry;
setting the state to be ready upon assigning the threshold;
preparing the first data descriptor and the second data descriptor by one or more CPU;
transferring data from a source device to a data buffer using a first DMA engine according to the first data descriptor subsequent to the preparation completion thereof;
monitoring an address bus for detecting a starting address of the first data descriptor;
monitoring a data bus for detecting a first valid data of the first DMA engine;
transferring one or more valid data of the first DMA engine to a destination device using a second DMA engine according to the second data descriptor upon detecting the first valid data of the first DMA engine;
setting the state to be completed upon the first DMA engine data transfer reaching the threshold of the entry;
setting the state to be initiated subsequent to the second DMA engine starting data transfer and the state being set to completed; and
setting the state to be free upon the first DMA engine detecting the status being set to initiated.

5. The method of claim 4, after the step of transferring one or more valid data of the first DMA engine, further comprising the steps of:
Stopping the second DMA engine data transfer upon a buffer overflow; and
transferring one or more data from the data buffer to the destination device using a second DMA engine according to the second data descriptor upon the first DMA engine data transfer reaching the threshold of the entry.

6. A data transfer method comprising the steps of:
checking a data structure for an entry comprising a state set to be free;
assigning an index of the entry to a first data descriptor and a second data descriptor;
assigning a value to a threshold of the entry;
setting the state to be ready upon assigning the threshold;
preparing the first data descriptor and the second data descriptor by one or more CPU;
transferring data from a source device to a data buffer using a first DMA engine according to the first data descriptor subsequent to the preparation completion thereof;
monitoring an address bus for detecting a starting address of the first data descriptor;
monitoring a data bus for detecting a first valid data of the first DMA engine;
transferring one or more valid data of the first DMA engine to a destination device using a second DMA engine according to the second data descriptor upon detecting the first valid data of the first DMA engine;
setting the state to be completed upon the first DMA engine data transfer reaching the threshold of the entry; and
setting the state to be free subsequent to the second DMA engine starting data transfer and the state being set to completed.

7. A data structure stored in a computer-readable storage medium, said data structure for use with a storage device disposed to coordinate dual channel DMA transfers by at least using said data structure, a first DMA engine, a second DMA engine, and a data buffer; said data structure comprising:
one or more entries, including a first entry that comprises a status initialized to be free and a first index field;
wherein a first data descriptor and a second data descriptor are assigned to the first entry if the status is free;
wherein the first and second DMA engines are disposed to respectively perform said DMA transfers by accessing the data buffer as specified by the first and second data descriptors;
wherein the first entry is further associated with a first threshold field;
wherein the status of the first entry is updated to indicate that values have been assigned respectively to the first index field and the first threshold field;
wherein the first data descriptor and the second data descriptor are prepared by one or more CPU;
wherein the first DMA engine transfers data from a source device to the data buffer according to the first data descriptor subsequent to the preparation completion thereof;
wherein the status is set to be active upon the first DMA engine starting data transfer;
wherein the status is set to be completed upon the first DMA engine data transfer reaching the threshold;
wherein the second DMA engine transfers data from the data buffer to a destination device according to the second data descriptor upon the preparation completion thereof and the status being set to be completed;
wherein the status is set to be initiated upon the second DMA engine starting data transfer; and
wherein the status is set to be free upon the first DMA engine detecting the status being set to initiated.

8. The data structure of claim 7 wherein:
the data buffer includes a data stripe buffer, said data stripe buffer including a data stripe buffer size; and
at one of the entries further includes a range field for tracking an end address of the data stripe buffer and a number of times a data stripe of data is transferred from the data stripe buffer.

9. The data structure of claim 7 wherein the first data descriptor and the second data descriptor are prepared concurrently.

10. The data structure of claim 7 wherein the first and second DMA engine transfer data from the source device to the destination device in response to the data structure without intervention from the one or more CPU subsequent to the first and second data descriptors preparation completion thereof.

11. The data structure of claim 7:
wherein the data buffer comprises one or more data stripe buffer;
wherein one or more entry further comprises one or more range for tracking end address of the one or more data stripe buffer and number of data stripe fully transferred.

12. The data structure of claim 11 wherein the one or more range further comprises one or more offset select, one or more minimum range and one or more maximum range whereby size of the one or more data stripe buffer is determined and compare logic for generating completed status is reduced.

13. The data structure of claim 11 wherein data transfer to the one or more stripe is handled by one or more DMA engine.

* * * * *